US012754399B2

(12) United States Patent
Okada

(10) Patent No.: US 12,754,399 B2
(45) Date of Patent: Oct. 6, 2026

(54) IMAGING OPTICAL SYSTEM AND IMAGE PICKUP APPARATUS HAVING THE SAME

(71) Applicant: CANON KABUSHIKI KAISHA, Tokyo (JP)

(72) Inventor: Takashi Okada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 18/824,964

(22) Filed: Sep. 5, 2024

(65) Prior Publication Data

US 2025/0116845 A1 Apr. 10, 2025

(30) Foreign Application Priority Data

Oct. 5, 2023 (JP) ................................ 2023-173430

(51) Int. Cl.

| | |
|---|---|
| ***G02B 13/00*** | (2006.01) |
| ***G02B 9/62*** | (2006.01) |
| ***G02B 27/42*** | (2006.01) |
| *G02B 1/00* | (2006.01) |
| *G02B 5/18* | (2006.01) |

(52) U.S. Cl.

CPC .......... *G02B 13/0045* (2013.01); *G02B 9/62* (2013.01); *G02B 13/0055* (2013.01); *G02B 27/4205* (2013.01); *G02B 1/002* (2013.01); *G02B 5/1895* (2013.01)

(58) Field of Classification Search

CPC ................. G02B 1/002; G02B 5/1871; G02B 5/189–1895; G02B 9/62; G02B 13/0045; G02B 13/0055; G02B 27/4205–4216

See application file for complete search history.

(56) References Cited

U.S. PATENT DOCUMENTS

| | | | | |
|---|---|---|---|---|
| 9,151,938 | B2 | 10/2015 | Okada | |
| 10,969,564 | B2 | 4/2021 | Okada | |
| 11,927,723 | B2 | 3/2024 | Okada | |
| 2020/0174163 | A1* | 6/2020 | Han | G02B 5/1895 |
| 2020/0355913 | A1* | 11/2020 | Park | G02B 1/002 |
| 2021/0132256 | A1* | 5/2021 | Park | G02B 5/1871 |
| 2021/0247549 | A1* | 8/2021 | Park | G02B 1/002 |
| 2021/0302695 | A1 | 9/2021 | Okada | |
| 2022/0082794 | A1 | 3/2022 | Kim | |
| 2022/0206186 | A1 | 6/2022 | Chen | |
| 2023/0127423 | A1* | 4/2023 | Park | G02B 13/0045 359/356 |
| 2024/0004163 | A1 | 1/2024 | Okada | |
| 2024/0045186 | A1 | 2/2024 | Okada | |

FOREIGN PATENT DOCUMENTS

| | | |
|---|---|---|
| JP | 2022-542172 A | 9/2022 |
| WO | 2021/021671 A1 | 2/2021 |

* cited by examiner

*Primary Examiner* — Nicholas R. Pasko

(74) *Attorney, Agent, or Firm* — Carter, DeLuca & Farrell LLP

(57) ABSTRACT

An imaging optical system includes an imaging lens, and an optical element disposed on an image side of the imaging lens. At least one surface of the optical element is a diffractive surface with a controlled wavelength dispersion characteristic. Predetermined inequalities are satisfied.

10 Claims, 4 Drawing Sheets

IMAGING OPTICAL SYSTEM AND IMAGE PICKUP APPARATUS HAVING THE SAME

BACKGROUND

Technical Field

One of the aspects of the embodiments relates to an imaging optical system and an image pickup apparatus having the same.

Description of Related Art

Japanese PCT Domestic Publication No. 2022-542172 discloses an imaging system in which a nanostructure element is disposed on a substrate layer disposed at an arbitrary distance from an image sensor to focus an incident angle of a chief ray on the image sensor to almost zero degrees. Each of U.S. Patent Applications Publication Nos. 2022/0082794 and 2022/0206186 discloses a configuration that performs dispersion control using a metasurface lens.

SUMMARY

An imaging optical system according to one aspect of the disclosure includes an imaging lens, and an optical element disposed on an image side of the imaging lens. At least one surface of the optical element is a diffractive surface with a controlled wavelength dispersion characteristic. Where $\nu_0$ is an Abbe number of the diffractive surface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_o} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/f1 < 0.2$$

$$-0.10 < 1/\nu_0 < 0.02$$

where Tk is an exit pupil position of the imaging lens in which a sign on an object side is negative with respect to an image plane as a reference, and fl is a focal length of the optical element, and fl is a focal length of the optical element including the diffractive surface. An image pickup apparatus having the above imaging optical system also constitutes another aspect of the disclosure.

An imaging optical system according to another aspect of the disclosure includes an imaging lens, and an optical element disposed on an image side of the imaging lens. At least one surface of the optical element is a metasurface with a controlled wavelength dispersion characteristic. Where $\nu_0$ is an Abbe number of the metasurface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_o} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/f1 < 0.2$$

$$-0.10 < 1/\nu_0 < 0.02$$

where Tk is an exit pupil position of the imaging lens by setting an object side to be negative with respect to an image plane as a reference, and fl is a focal length of the optical element including the metasurface. An image pickup apparatus having the above imaging optical system also constitutes another aspect of the disclosure.

Further features of the disclosure will become apparent from the following description of embodiments with reference to the attached drawings.

DESCRIPTION OF THE EMBODIMENTS

Figure 1:
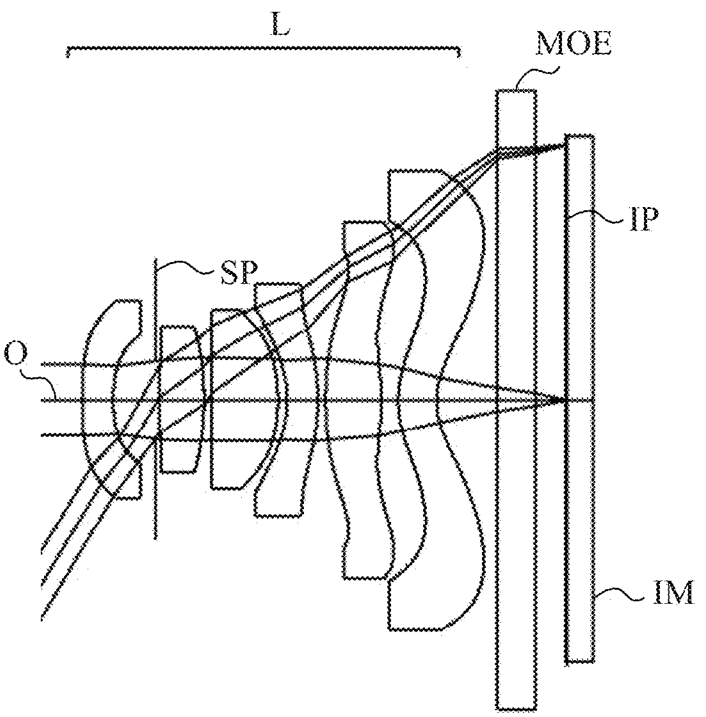
FIG. 1 is a sectional view of an imaging optical system according to Example 1.

Referring now to the accompanying drawings, a detailed description will be given of embodiments according to the disclosure. Corresponding elements in respective figures will be designated by the same reference numerals, and a duplicate description thereof will be omitted.

Figure 3:
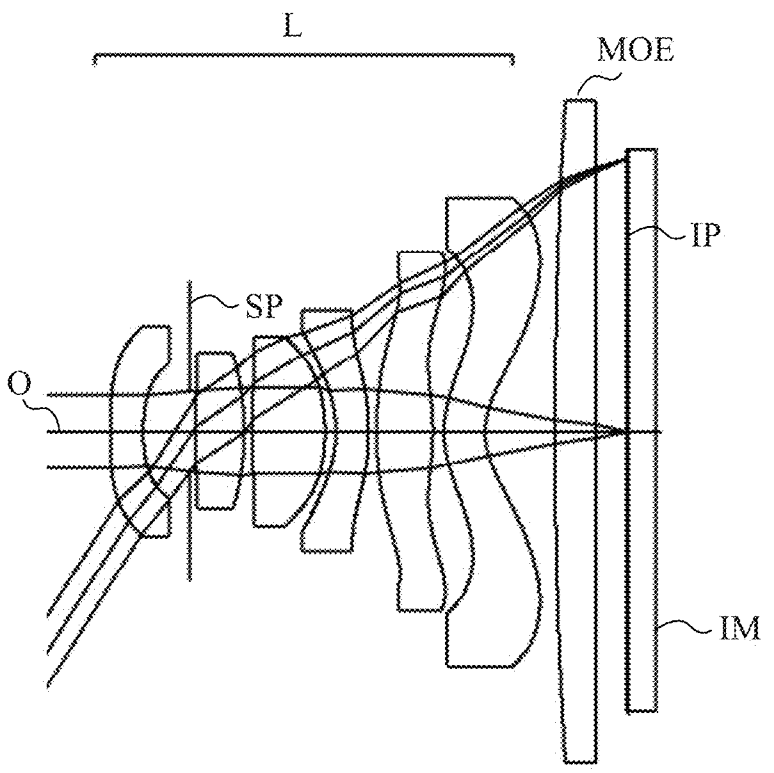
FIG. 3 is a sectional view of an imaging optical system according to Example 2.
Figure 5:
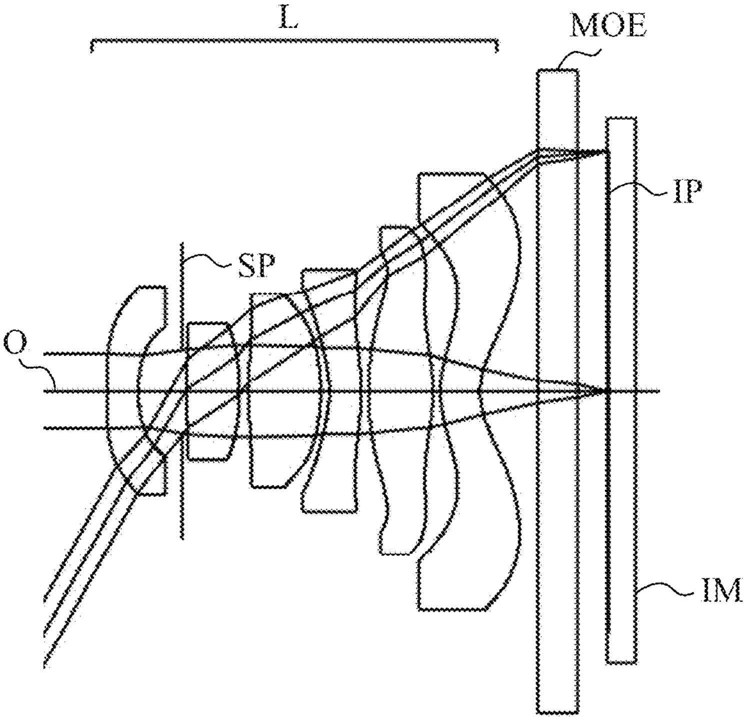
FIG. 5 is a sectional view of an imaging optical system according to Example 3.

FIGS. 1, 3, and 5 are sectional views of imaging optical systems according to Examples 1 to 3, respectively. The imaging optical system according to each example is an optical system for an image pickup apparatus such as a digital video camera, a digital still camera, a broadcasting cameras, a film-based camera, and a surveillance camera.

In each sectional view, a left side is an object side and a right side is an image side. The imaging optical system according to each example includes an imaging lens L, and an optical element disposed on the image side of the imaging lens L. At least one surface of the optical element is a diffractive surface with a controlled wavelength dispersion characteristic. In the imaging optical system according to each example, an optical element MOE including a diffractive surface with a controlled wavelength dispersion characteristic is disposed.

In each sectional view, O is an optical axis, and SP is an aperture stop (diaphragm). IP is an image plane. In a case where the imaging optical system according to each example is used as an imaging optical system for a digital still camera or digital video camera, an imaging surface of a solid-state image sensor (photoelectric conversion element) IM such as a CCD sensor or CMOS sensor is placed on the image plane IP. In a case where the imaging optical system according to each example is used as an imaging optical system for a film-based camera, a photosensitive surface equivalent to a film plane is placed on the image plane IP.

Figure 2:
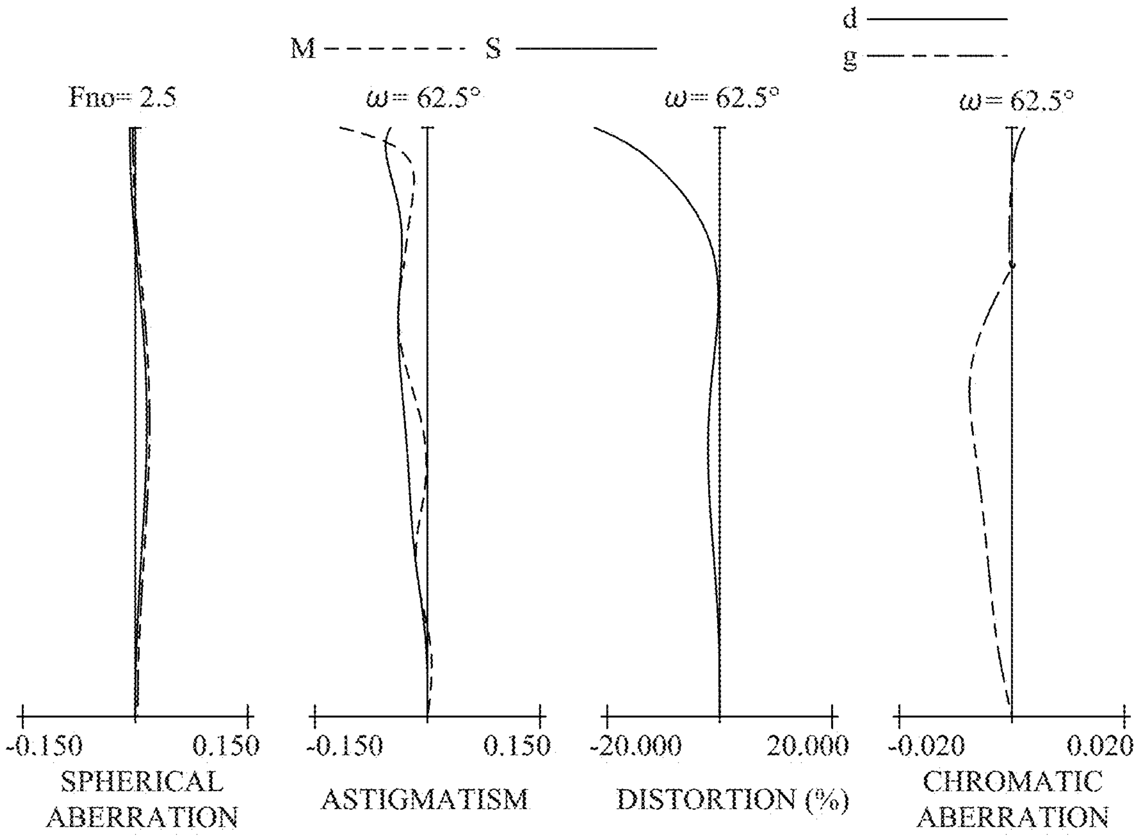
FIG. 2 is a longitudinal aberration diagram of the imaging optical system according to Example 1 in an in-focus state at infinity.
Figure 4:
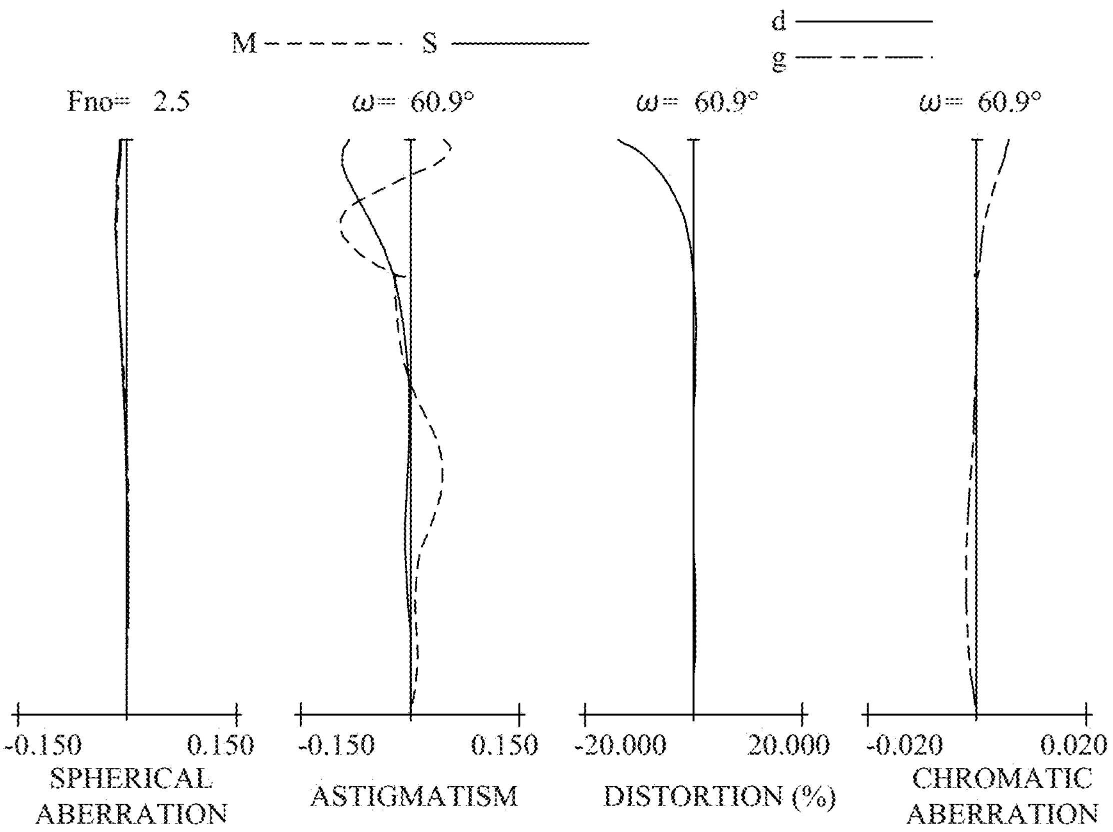
FIG. 4 is a longitudinal aberration diagram of the imaging optical system according to Example 2 in an in-focus state at infinity.
Figure 6:
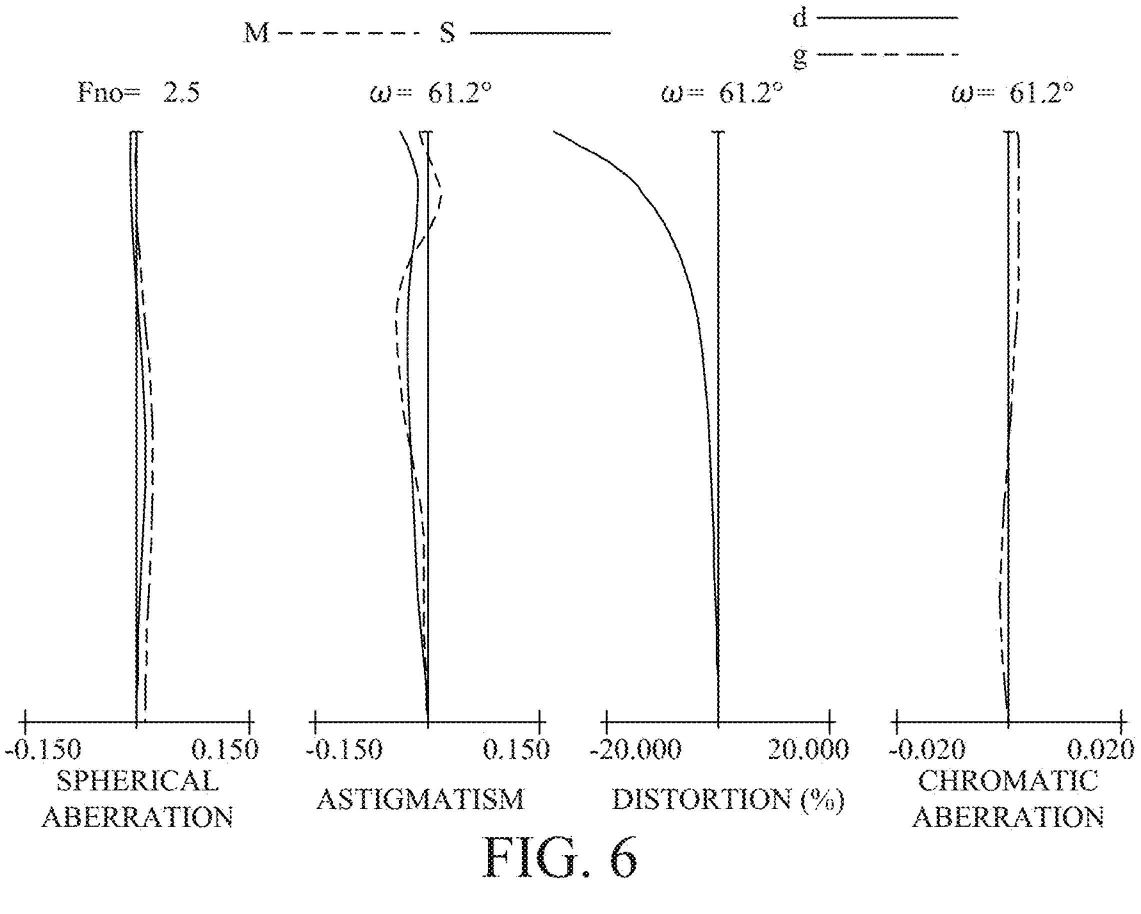
FIG. 6 is a longitudinal aberration diagram of the imaging optical system according to Example 3 in an in-focus state at infinity.

FIGS. 2, 4, and 6 are longitudinal aberration diagrams of the imaging optical systems according to Examples 1 to 3 in an in-focus state at infinity, respectively. In a spherical aberration diagram, Fno is an F-number. The spherical aberration diagram illustrates spherical aberration amounts for the d-line (wavelength 587.6 nm) and g-line (wavelength 435.8 nm). In an astigmatism diagram, S represents an astigmatism amount on a sagittal image plane, and M represents an astigmatism amount on a meridional image plane. A distortion diagram illustrates a distortion amount for the d-line. A chromatic aberration diagram illustrates a chromatic aberration amount for the g-line. ω is a half angle of view (°).

A description will now be given of a characteristic configuration of the imaging optical system according to each example.

In reducing the size of an imaging optical system, particularly in the case of a wide-angle lens, reducing the overall length brings an imaging exit pupil closer to the image plane, and an incident angle on the image sensor becomes larger. A method has conventionally been known that places a microlens array at a position just before the image sensor to suppress the incident angle on the imaging surface of the image sensor. However, this method has a limit to mitigating the incident angle, and as the size of the imaging optical system is reduced, coloring around the periphery of the image, known as false color, poses a problem.

Accordingly, the optical system according to each example reduces the incident angle on the imaging surface by setting at least one surface of the optical element to a diffractive surface with a controlled wavelength dispersion characteristic.

The imaging optical system according to each example satisfies the following inequality (1):

$$-1.5 < Tk/f1 < 0.2 \tag{1}$$

where Tk is an exit pupil position of the imaging lens L by setting the object side to be negative with respect to the image plane as a reference, and fl is a focal length of an optical element (optical element MOE in the imaging optical system according to each example) that includes a diffractive surface with a controlled wavelength dispersion characteristic.

Inequality (1) defines a relationship between the exit pupil position of the imaging lens L and the refractive power of the optical element MOE. Satisfying inequality (1) can suppress the incident angle on the image sensor. In a case where the focal length of the optical element MOE becomes small relative to the exit pupil position and the value becomes lower than the lower limit of inequality (1), the structure of the diffractive surface becomes complex and it becomes difficult to manufacture the optical element MOE. In addition, the exit pupil of the imaging optical system becomes positive beyond the telecentric position, and the incident angle on the imaging surface increases. In a case where the focal length of the optical element MOE becomes large relative to the exit pupil position and the value becomes higher than the upper limit of inequality (1), the refractive power of the optical element MOE becomes insufficient, and it becomes difficult to suppress the incident angle on the image sensor or the imaging optical system becomes large.

In a case where the optical element MOE is given refractive power, a light beam can be bent in a desired direction at a specific wavelength, but unless light beams of different wavelengths are properly controlled, lateral chromatic aberration occurs around the periphery of the image and it becomes difficult to acquire a high-definition image.

The imaging optical system according to each example satisfies the following inequality (2):

$$-0.10 < 1/\nu_0 < 0.02 \tag{2}$$

where $\nu_0$ is an Abbe number of the diffractive surface with the controlled wavelength dispersion characteristic. The Abbe number $\nu_0$ is defined by the following equation in a case where a reference wavelength is the d-line ($\lambda_d$=0.58756 μm), and primary dispersions are the F-line ($\lambda_F$=0.48613 μm) and the C-line ($\lambda_C$=0.65627 μm):

$$\frac{1}{\nu_o} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)}$$

where and $\psi(\lambda_d)$, $\psi(\lambda_F)$, and $\psi(\lambda_C)$ are optical path difference functions for the wavelengths of the d-line, the F-line, and the C-line, and $P(\lambda_d)$, $P(\lambda_F)$, and $P(\lambda_C)$ are optical path difference dispersions of surface for the wavelengths of the d-line, the F-line, and the C-line.

Satisfying inequality (2) can provide an image without chromatic aberration even if the incident angle on the image sensor is suppressed using inequality (1). In a case where the negative dispersion increases and the value becomes lower than the lower limit of inequality (2), the lateral chromatic aberration on the short wavelength side occurs on the overexposure side and the image quality degrades. In a case where the positive dispersion increases and the value becomes higher than the upper limit of inequality (2), the lateral chromatic aberration on the short wavelength side occurs on the underexposure side and the image quality degrades.

The imaging lens L normally has positive refractive power, so that lateral chromatic aberration on the short wavelength side is likely to occur on the underexposure side. Therefore, making the Abbe number of the optical element MOE negative can cancel the lateral chromatic aberration occurring in the imaging lens L, and it becomes easier to satisfactorily correct the aberration in the imaging optical system.

This configuration can realize an imaging optical system that can relax the incident angle on the imaging surface of the image sensor while chromatic aberration is satisfactorily corrected.

Inequalities (1) and (2) may be replaced with inequalities (1a) and (2a):

$$-1.40 < Tk/f1 < 0.15 \quad (1a)$$

$$-0.080 < 1/\nu_0 < 0.015 \quad (2a)$$

Inequalities (1) and (2) may be replaced with inequalities (1b) and (2b):

$$-1.2 < Tk/f1 < 0.1 \quad (1b)$$

$$-0.06 < 1/\nu_0 < 0.01 \quad (2b)$$

A description will now be given of inequalities that the imaging optical system according to each example may satisfy. The imaging optical system according to each example may satisfy one or more of the following inequalities (3) to (6):

$$0.05 < Psum < 0.40 \quad (3)$$

$$-0.050 < \sum \Phi i/\nu di < -0.001 \quad (4)$$

$$0.8 < fmoe/f1 < 3.0 \quad (5)$$

$$-1.0 < STO/f1 < 2.5 \quad (6)$$

where Psum is a Petzval sum of the imaging lens L, Φi is refractive power of an i-th lens (where i is a natural number) counted from the object side among the lenses that constitute the imaging lens L, νdi is an Abbe number of the i-th lens (where i is a natural number) counted from the object side among the lenses that constitute the imaging lens L, fmoe is a focal length of the diffractive surface with the controlled wavelength dispersion characteristic, and STO is a distance on the optical axis from the image plane (imaging surface) to the aperture stop SP.

Inequality (3) defines a curvature of field amount of the imaging lens L. Satisfying inequality (3) can cancel curvature of field occurring in the optical element MOE, and satisfactorily correct aberrations of the imaging optical system. In a case where the Petzval sum of the imaging lens L reduces and the value becomes lower than the lower limit of inequality (3), the curvature of field of the imaging optical system occurs on the overexposure side. In a case where the Petzval sum of the imaging lens L increases and the value becomes higher than the upper limit of inequality (3), the curvature of field of the imaging optical system occurs on the underexposure side.

Inequality (4) defines lateral chromatic aberration of the imaging lens L. Satisfying inequality (4) can cancel the lateral chromatic aberration occurring in the optical element MOE, and satisfactorily correct aberrations of the imaging optical system. In a case where the value becomes lower than the lower limit of inequality (4), the lateral chromatic aberration of the imaging optical system occurs on the overexposure side. In a case where the value becomes higher than the upper limit of inequality (4), the lateral chromatic aberration of the imaging optical system occurs on the underexposure side.

Inequality (5) specifies the refractive power of the diffractive surface of the optical element MOE with the controlled wavelength dispersion characteristic. In a case where the refractive power of the diffractive surface becomes too weak and the value becomes lower than the lower limit of inequality (5), the refractive power of the optical element MOE becomes weak, and the incident angle on the imaging plane increases or the size of the imaging optical system increases. In an attempt to maintain the refractive power of the optical element MOE, the refractive power of the surface opposite the diffractive surface becomes strong. In a case where the refractive power of the diffractive surface becomes too strong and the value becomes higher than the upper limit of inequality (5), the structure of the diffractive surface becomes complicated and it becomes difficult to manufacture the optical element MOE.

Inequality (6) defines a relationship between the distance on the optical axis from the image plane to the aperture stop SP and the refractive power of the optical element MOE. In a case where the distance from the image plane to the aperture stop SP increases, the exit pupil position also separates from the image plane, and an effect similar to that of inequality (1) is obtained. In a case where the distance on the optical axis from the image plane to the aperture stop SP becomes small relative to the focal length of the optical element MOE, and the value becomes lower than the lower limit of inequality (6), the refractive power of the optical element MOE becomes strong, the structure of the diffractive surface becomes complex, and it becomes difficult to manufacture the optical element MOE. In a case where the distance on the optical axis from the image plane to the aperture stop SP becomes large relative to the focal length of the optical element MOE, and the value becomes higher than the upper limit of inequality (6), the refractive power of the optical element MOE becomes insufficient, and it becomes difficult to suppress the incident angle on the image sensor or the size of the imaging optical system increases.

Inequalities (3) to (6) may be replaced with inequalities (3a) to (6a):

$$0.10 < Psum < 0.35 \quad (3a)$$

$$-0.030 < \sum \Phi i/\nu di < -0.003 \quad (4a)$$

$$0.9 < fmoe/f1 < 2.5 \quad (5a)$$

$$-0.5 < STO/f1 < 2.0 \quad (6a)$$

Inequalities (3) to (6) may be replaced with inequalities (3b) to (6b):

$$0.15 < Psum < 0.30 \quad (3b)$$

$$-0.015 < \sum \Phi i/\nu di < -0.005 \quad (4b)$$

$$0.95 < fmoe/f1 < 2.00 \quad (5b)$$

$$-0.2 < STO/f1 < 1.5 \quad (6b)$$

A detailed description will now be given of the imaging optical system according to each example.

The imaging optical system according to Example 1 is an optical system with a focal length of 2.30 mm, an F-number of 2.50, and a half angle of view of 56.31 degrees. The imaging lens L consists of six lenses (first lens to sixth lens) with negative, positive, positive, negative, positive, and negative refractive powers, arranged in order from the object side to the image side. All of these six lenses have aspherical surfaces on both sides. The aperture stop SP is disposed between the first lens and the second lens. An optical element MOE is placed between the imaging lens L and the image sensor IM. A surface on the object side of the optical element MOE is a diffractive surface with a controlled wavelength dispersion characteristic, and the dispersion of the diffractive surface is set to zero dispersion. Placing the diffraction element on a flat plate can reduce the difficulty of manufacturing.

The imaging optical system according to Example 2 is an optical system with a focal length of 2.22 mm, F-number of 2.50, and half angle of view of 57.20 degrees. The configuration of the imaging lens L is similar to that according to Example 1. An optical element MOE is placed between the imaging lens L and the image sensor IM. A surface on the object side of the optical element MOE has a convex shape facing the object side, and shares the refractive power of the optical element MOE. A surface on the image side of the optical element MOE is the diffractive surface with controlled wavelength dispersion characteristic, and the diffractive surface has negative dispersion with an Abbe number of −23.31.

The imaging optical system according to Example 3 is an optical system with a focal length of 2.33 mm, F-number of 2.50, and half angle of view of 52.14 degrees. The configuration of the imaging lens L is similar to that of Example 1. An optical element MOE is disposed Between the imaging lens L and the image sensor IM. In Example 3, aberrations are corrected in the imaging lens L alone, and in a case where the image sensor has a good angular characteristic, imaging is available without using the optical element MOE. In other words, disposing the optical element MOE according to Example 3 in a normal imaging lens can change only the incident angle characteristic of the image sensor. A surface on the object side of the optical element MOE is the diffractive surface with the controlled wavelength dispersion characteristic, and the configuration and dispersion of the diffractive surface are similar to those of Example 1.

In each example, the aberration may be corrected by image processing, or another method may be used. The structure that realizes the optical path difference function of the diffractive optical element may be a so-called single-layer metasurface in which the metasurface includes a single layer, or may be a so-called stacked metasurface in which the metasurface includes a plurality of layers. The optical element according to the present disclosure may have a metasurface on a surface of a low-pass filter, an IR cut filter, or the like disposed near the image sensor. This makes it possible to reduce the number of components and realize a compact imaging optical system. In addition to the optical element of the present disclosure, an unillustrated optical block may be used as a low-pass filter or an IR cut filter.

A description will now be given of numerical examples corresponding to Examples 1 to 3.

In surface data of each numerical example, r represents a radius of curvature of each optical surface, and d (mm) represents an on-axis distance (distance on the optical axis) between m-th and (m+1)-th surfaces, where m is a surface number counted from the light incidence side. nd represents a refractive index of each optical member for the d-line, and νd represents an Abbe number of the optical member based on the d-line. The Abbe number νd of a certain material is expressed as follows:

$$\nu d = (Nd - 1)/(NF - NC)$$

where Nd, NF, and NC are the refractive indices for the d-line (587.6 nm), F-line (486.1 nm), and C-line (656.3 nm) in the Fraunhofer line:

In each numerical example, d, focal length (mm), F-number, and half angle of view (degrees) are all values when the imaging optical system according to each example is in an in-focus state on an object at infinity. A "back focus" is a distance on the optical axis from the final lens surface (a lens surface closest to the image) to a paraxial image plane, expressed as an air-equivalent length. An "overall lens length" is a distance on the optical axis from the foremost lens surface (the lens surface closest to the object) of the imaging optical system to the final surface plus the back focus.

In a case where the optical surface is aspheric, an asterisk * is added to the right of the surface number. The aspheric shape is expressed as follows:

$$X = (h^2/R)/\left[1 + \{1 - (1+K)(h/R)^2\}^{1/2}\right] + A4\times h^4 + A6\times h^6 + A8\times h^8 + A10\times h^{10} + A12\times h^{12}$$

where X is a displacement from a surface vertex in an optical axis direction, h is a height from the optical axis in the direction perpendicular to the optical axis, R is a paraxial radius of curvature, K is a conic constant, and A4, A6, A8, A10, and A12 are aspheric coefficients of each order. "e±XX" in each aspheric coefficient means "$\times 10^{\pm XX}$".

The optical path difference function of the surface in a designed wavelength is expressed as follows:

$$\psi 0 = U2\cdot h^2 + U4\cdot h^4 + U6\cdot h^6 + U8\cdot h^8 + U10\cdot h^{10}$$

where U2, U4, U6, U8, and U10 are coefficients of the optical path difference function of the surface. "diffraction" refers to a surface that has been optically designed using the optical path difference function of the surface.

Numerical Example 1

UNIT: mm

SURFACE DATA

| Surface No. | r | d | nd | νd | Effective Diameter |
|---|---|---|---|---|---|
| 1* | 17.576 | 0.40 | 1.53500 | 56.0 | 2.57 |
| 2* | 2.430 | 0.55 | | | 1.65 |
| 3 (SP) | ∞ | 0.05 | | | 1.08 |
| 4* | 7.354 | 0.58 | 1.53500 | 56.0 | 1.30 |
| 5* | −3.977 | 0.09 | | | 1.90 |

-continued

| UNIT: mm | | | | | |
|---|---|---|---|---|---|
| 6* | 22.112 | 0.87 | 1.53500 | 56.0 | 1.94 |
| 7* | −2.219 | 0.12 | | | 2.31 |
| 8* | −1.450 | 0.40 | 1.67070 | 19.3 | 2.42 |
| 9* | −2.978 | 0.10 | | | 3.00 |
| 10* | 4.760 | 0.73 | 1.53500 | 56.0 | 3.87 |
| 11* | −2.707 | 0.22 | | | 4.61 |
| 12* | 1.317 | 0.50 | 1.67070 | 19.3 | 4.67 |
| 13* | 0.908 | 0.79 | | | 5.94 |
| 14 (diffraction) | ∞ | 0.50 | 1.51633 | 64.1 | 8.00 |
| 15 | ∞ | 0.40 | | | 8.00 |
| Image Plane | ∞ | | | | |

ASPHERIC DATA

1st Surface
K = 9.90007e+01 A 4 = 2.48086e−01 A 6 = −2.42915e−01 A 8 = 2.91689e−01
A10 = −2.24650e−01 A12 = 9.59098e−02 A14 = −1.21432e−02 A16 = −2.95944e−03
2nd Surface
K = 4.89422e+00 A 4 = 3.65560e−01 A 6 = −8.43191e−02 A 8 = −1.86680e+00
A10 = 1.12029e+01 A12 = −2.75888e+01 A14 = 3.37170e+01 A16 = −1.63504e+01
4th Surface
K = 0.00000e+00 A 4 = −1.08610e−02 A 6 = 1.79646e−01 A 8 = −6.50335e−01
A10 = 7.01469e−01
5th Surface
K = 0.00000e+00 A 4 = −8.90619e−03 A 6 = −4.86125e−02 A 8 = 8.44771e−02
A10 = −1.88038e−02 A12 = −4.18980e−02
6th Surface
K = 0.00000e+00 A 4 = −4.08132e−03 A 6 = −4.54474e−02 A 8 = 9.77174e−04
A10 = 8.27491e−02 A12 = −4.01016e−02
7th Surface
K = 0.00000e+00 A 4 = −7.51533e−02 A 6 = −3.28907e−02 A 8 = −3.45258e−02
A10 = 4.12748e−02
8th Surface
K = 0.00000e+00 A 4 = 5.21400e−02 A 6 = 7.67770e−02 A 8 = −7.40533e−02
A10 = 5.55810e−02 A12 = −1.60881e−02
9th Surface
K = 0.00000e+00 A 4 = −6.05322e−02 A 6 = 1.04622e−01 A 8 = −3.05453e−02
A10 = −1.53191e−04 A12 = 6.91537e−04
10th Surface
K = 0.00000e+00 A 4 = 4.01857e−02 A 6 = −1.81149e−02 A 8 = 1.72265e−03
A10 = −1.66674e−04
11th Surface
K = 0.00000e+00 A 4 = 2.01306e−01 A 6 = −5.98149e−02 A 8 = 8.38921e−03
A10 = −4.89678e−04
12th Surface
K = −8.04920e−01 A 4 = −1.61372e−01 A 6 = 3.19208e−02 A 8 = −4.59935e−03
A10 = 2.10178e−04
13th Surface
K = −2.72052e+00 A 4 = −7.06132e−02 A 6 = 1.96761e−02 A 8 = −3.53477e−03
A10 = 3.92793e−04 A12 = −2.73824e−05 A14 = 8.58965e−07
14th Surface (Diffractive surface)
U 2 = −5.63346e−02 U 4 = −1.68445e−03 U 6 = 7.13021e−05

OPTICAL PATH DIFFERENCE DISPERSION OF SURFACE

P(λ) = 0.58756/λ

VARIOUS DATA

| | |
|---|---|
| Focal Length | 2.30 |
| Fno | 2.50 |
| Half Angle of View (°) | 56.31 |
| Image Height | 3.45 |
| Overall Lens Length | 6.30 |
| BF | 0.40 |
| Entrance Pupil Position | 0.77 |
| Exit Pupil Position | −5.99 |
| Exit Pupil Position of Imaging Lens | −4.25 |

Numerical Example 2

UNIT: mm

SURFACE DATA

| Surface No. | r | d | nd | vd | Effective Diameter |
|---|---|---|---|---|---|
| 1* | 22.442 | 0.40 | 1.53500 | 56.0 | 2.54 |
| 2* | 2.481 | 0.56 | | | 1.62 |
| 3 (SP) | ∞ | 0.08 | | | 0.97 |
| 4* | 9.531 | 0.60 | 1.53500 | 56.0 | 1.30 |
| 5* | −3.455 | 0.11 | | | 1.90 |
| 6* | 22.703 | 0.88 | 1.53500 | 56.0 | 1.92 |
| 7* | −2.184 | 0.13 | | | 2.29 |
| 8* | −1.509 | 0.40 | 1.67070 | 19.3 | 2.41 |
| 9* | −3.012 | 0.10 | | | 2.91 |
| 10* | 5.513 | 0.69 | 1.53500 | 56.0 | 3.77 |
| 11* | −2.596 | 0.13 | | | 4.35 |
| 12* | 1.301 | 0.50 | 1.67070 | 19.3 | 4.43 |
| 13* | 0.876 | 0.83 | | | 5.66 |
| 14 (diffraction) | 63.381 | 0.50 | 1.51633 | 64.1 | 8.00 |
| 15 | ∞ | 0.40 | | | 8.00 |
| Image Plane | ∞ | | | | |

ASPHERIC DATA

1st Surface
K = −3.86919e+01 A 4 = 2.41588e−01 A 6 = −2.41928e−01 A 8 = 2.89633e−01
A10 = −2.23921e−01 A12 = 9.59516e−02 A14 = −1.20885e−02 A16 = −2.78335e−03
2nd Surface
K = 5.21399e+00 A 4 = 3.42258e−01 A 6 = −6.13440e−02 A 8 = −2.00079e+00
A10 = 1.13128e+01 A12 = −2.74538e+01 A14 = 3.35094e+01 A16 = −1.61949e+01
4th Surface
K = 0.00000e+00 A 4 = 9.18393e−03 A 6 = 7.97704e−02 A 8 = −5.19262e−01
A10 = 6.29534e−01
5th Surface
K = 0.00000e+00 A 4 = −1.94958e−02 A 6 = −1.77983e−02 A 8 = 9.07516e−02
A10 = −4.91208e−02 A12 = −2.60306e−02
6th Surface
K = 0.00000e+00 A 4 = −1.38771e−02 A 6 = −3.44599e−02 A 8 = 6.51807e−03
A10 = 6.68454e−02 A12 = −3.25873e−02
7th Surface
K = 0.00000e+00 A 4 = −7.64664e−02 A 6 = −4.08103e−02 A 8 = −2.21156e−02
A10 = 3.46808e−02
8th Surface
K = 0.00000e+00 A 4 = 4.41172e−02 A 6 = 6.68996e−02 A 8 = −6.35215e−02
A10 = 4.88373e−02 A12 = −1.42106e−02
9th Surface
K = 0.00000e+00 A 4 = −5.89835e−02 A 6 = 1.02374e−01 A 8 = −3.03807e−02
A10 = 2.55099e−04 A12−6.73171e−04
10th Surface
K = 0.00000e+00 A 4 = 4.3923le−02 A 6 = −2.01611e−02 A 8 = 2.61684e−03
A10 = −2.35583e−04
11th Surface
K = 0.00000e+00 A 4 = 2.03568e−01 A 6 = −5.99845e−02 A 8 = 8.58443e−03
A10 = −5.16256e−04
12th Surface
K = −7.88543e−01 A 4 = −1.65961e−01 A 6 = 3.13932e−02 A 8 = −4.46084e−03
A10 = 2.04899e−04
13th Surface
K = −2.54988e+00 A 4 = −6.93865e−02 A 6 = 1.89535e−02 A 8 = −3.52069e−03
A10 = 3.91221e−04 A12 = −2.48839e−05 A14 = 6.71496e−07
15th Surface (Diffractive surface)
U 2 = −1.13692e−01 U 4 = 1.50559e−03 U 6 = 1.19260e−04

OPTICAL PATH DIFFERENCE DISPERSION OF SURFACE $$P(\lambda) = 13.87546 \cdot \lambda^{10} - 153.95668 \cdot \lambda^9 + 1009.95630 \cdot \lambda^8 - 4356.52716 \cdot \lambda^7 + 13006.44877 \cdot \lambda^6 - 27470.79737 \cdot \lambda^5 + 41106.88437 \cdot \lambda^4 - 42762.08537 \cdot \lambda^3 + 29486.82651 \cdot \lambda^2 - 12144.39247 \cdot \lambda + 2266.41068$$

VARIOUS DATA

| | |
|---|---|
| Focal Length | 2.22 |
| Fno | 2.50 |
| Half Angle of View (°) | 57.20 |
| Image Height | 3.45 |
| Overall Lens Length | 6.30 |
| BF | 0.40 |

-continued

| UNIT: mm | |
|---|---|
| Entrance Pupil Position | 0.77 |
| Exit Pupil Position | −36.33 |
| Exit Pupil Position of Imaging Lens | −4.27 |

Numerical Example 3

UNIT: mm

SURFACE DATA

| Surface No. | r | d | nd | νd | Effective Diameter |
|---|---|---|---|---|---|
| 1* | 20.430 | 0.40 | 1.53500 | 56.0 | 2.60 |
| 2* | 2.174 | 0.56 | | | 1.63 |
| 3 (SP) | ∞ | 0.05 | | | 1.04 |
| 4* | 14.127 | 0.66 | 1.53500 | 56.0 | 1.20 |
| 5* | −3.479 | 0.12 | | | 1.70 |
| 6* | 5.019 | 0.91 | 1.53500 | 56.0 | 2.06 |
| 7* | −2.361 | 0.11 | | | 2.42 |
| 8* | −1.457 | 0.40 | 1.67070 | 19.3 | 2.53 |
| 9* | −3.015 | 0.10 | | | 3.03 |
| 10* | 4.462 | 0.81 | 1.53500 | 56.0 | 3.50 |
| 11* | −2.257 | 0.09 | | | 4.08 |
| 12* | 1.400 | 0.50 | 1.67070 | 19.3 | 4.25 |
| 13* | 0.849 | 0.72 | | | 5.42 |
| 14 (diffraction) | ∞ | 0.50 | 1.51633 | 64.1 | 8.00 |
| 15 | ∞ | 0.40 | | | 8.00 |
| Image Plane | ∞ | | | | |

ASPHERIC DATA

1st Surface
K = −3.72021e+01 A 4 = 2.52858e−01 A 6 = −2.57610e−01 A 8 = 3.23789e−01
A10 = −2.85442e−01 A12 = 1.57126e−01 A14 = −4.41254e−02 A16 = 3.72864e−03
2nd Surface
K = 2.88135e+00 A 4 = 3.98563e−01 A 6 = −4.23396e−01 A 8 = 6.89592e−01
A10 = 1.58942e+00 A12 = −8.42291e+00 A14 = 1.49105e+01 A16 = −9.39537e+00
4th Surface
K = 0.00000e+00 A 4 = −1.88163e−02 A 6 = 5.88929e−02 A 8 = −3.59062e−01
A10 = 3.48112e−01
5th Surface
K = 0.00000e+00 A 4 = −1.23712e−01 A 6 = 1.00415e−01 A 8 = −1.35266e−01
A10 = 1.52765e−01 A12 = −1.11587e−01
6th Surface
K = 0.00000e+00 A 4 = −1.04125e−01 A 6 = 7.39184e−02 A 8 = −4.58902e−02
A10 = 2.90998e−02 A12 = −7.76881e−03
7th Surface
K = 0.00000e+00 A 4 = 6.98768e−02 A 6 = −2.51434e−01 A 8 = 1.44386e−01
A10 = −2.27035e−02
8th Surface
K = 0.00000e+00 A 4 = 3.43960e−01 A 6 = −2.88160e−01 A 8 = 1.64638e−01
A10 = −4.44706e−02 A12 = 5.28482e−03
9th Surface
K = 0.00000e+00 A 4 = 1.19248e−01 A 6 = −2.42456e−02 A 8 = −2.70298e−03
A10 = 2.28000e−03 A12 = −3.77003e−04
10th Surface
K = 0.00000e+00 A 4 = 5.33684e−02 A 6 = −3.98652e−02 A 8 = 9.60901e−03
A10 = −1.54167e−03
11th Surface
K = 0.00000e+00 A 4 = 1.80297e−01 A 6 = −5.20218e−02 A 8 = 7.19376e−03
A10 = −4.36277e−04
12th Surface
K = −9.38278e−01 A 4 = −1.84025e−01 A 6 = 3.24158e−02 A 8 = −4.27734e−03
A10 = 3.23634e−04
13th Surface
K = −2.76835e+00 A 4 = −9.81714e−02 A 6 = 3.21162e−02 A 8 = −7.34394e−03
A10 = 1.04738e−03 A12 = −8.68086e−05 A14 = 3.14568e−06
14th Surface (Diffractive surface)
U 2 = 9.57493e−03 U4 = −6.02019e−03 U 6 = 1.10748e−04 U 8 = −3.78986e−06

-continued

| UNIT: mm | |
|---|---|
| OPTICAL PATH DIFFERENCE DISPERSION OF SURFACE | |
| $P(\lambda) = 0.58756/\lambda$ | |
| VARIOUS DATA | |
| Focal Length | 2.33 |
| Fno | 2.50 |
| Half Angle of View (°) | 52.14 |
| Image Height | 3.00 |
| Overall Lens Length | 6.32 |
| BF | 0.40 |
| Entrance Pupil Position | 0.77 |
| Exit Pupil Position | −3.52 |
| Exit Pupil Position of Imaging Lens | −4.10 |

TABLE 1 summarizes various values in each numerical example.

| | INEQUALITY | | | | | |
|---|---|---|---|---|---|---|
| | (1) Tk/f1 | (2) 1/ν0 | (3 Psum | (4) Σφi/νdi | (5) fmoe/f1 | (6) STO/f1 |
| EXAMPLE 1 | −0.4790 | 0.0000 | 0.2685 | −0.0067 | 1.0000 | 0.6032 |
| EXAMPLE 2 | −1.0025 | −0.0429 | 0.2522 | −0.0068 | 1.0331 | 1.2555 |
| EXAMPLE 3 | 0.0786 | 0.0000 | 0.2372 | −0.0100 | 1.0000 | −0.1025 |

Image Pickup Apparatus

Figure 7:
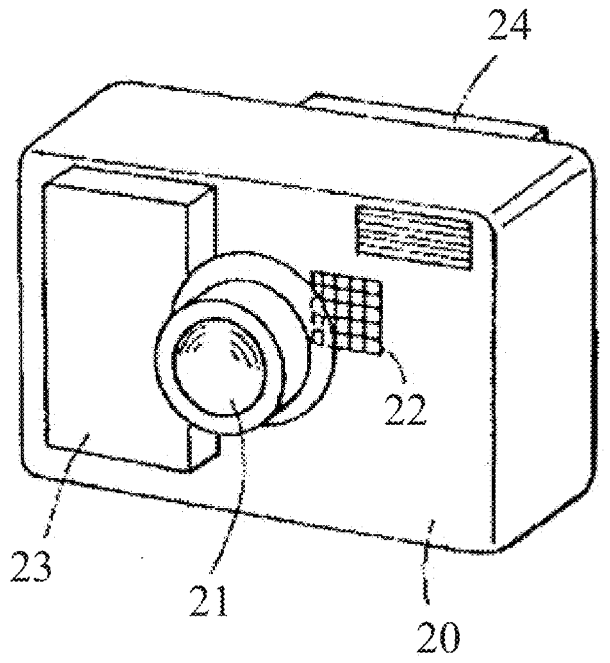
FIG. 7 illustrates an image pickup apparatus having an imaging optical system according to any one of Examples 1 to 3.

Referring now to FIG. 7, a description will be given of an example of a digital still camera (image pickup apparatus) having any one of the imaging optical systems according to Examples 1 to 3. FIG. 7 illustrates an image pickup apparatus having any one of the imaging optical systems according to Examples 1 to 3.

In FIG. 7, reference numeral 20 denotes a camera body, and reference numeral 21 denotes the imaging optical system according to any one of Examples 1 to 3. Reference numeral 22 denotes a solid-state image sensor (photoelectric conversion element) such as a CCD sensor or CMOS sensor that is built into the camera body 20 and receives and photoelectrically converts an object image (optical image) formed by the imaging optical system 21. Reference numeral 23 denotes a memory that records information corresponding to the object image photoelectrically converted by the solid-state image sensor 22. Reference numeral 24 denotes a viewfinder including a liquid crystal display panel or the like, and configured to observe the object image formed on the solid-state image sensor 22. The camera body 20 may be a so-called single-lens reflex camera having a quick-turn mirror, or a so-called mirrorless camera having no quick-turn mirror.

Thus, applying the imaging optical system according to each example to an image pickup apparatus such as a digital still camera can provide an image pickup apparatus that can mitigate an incident angle on an image sensor while satisfactorily correcting chromatic aberration.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims priority to Japanese Patent Application No. 2023-173430, which was filed on Oct. 5, 2023, and which is hereby incorporated by reference herein in its entirety.

What is claimed is:

1. An imaging optical system comprising:

an imaging lens; and an optical element disposed on an image side of the imaging lens, wherein at least one surface of the optical element is a diffractive surface with a controlled wavelength dispersion characteristic, and wherein where $\nu_0$ is an Abbe number of the diffractive surface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_0} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/fl < 02$$

$$-0.10 < 1/\nu_0 < 0.02$$

where Tk is an exit pupil position of the imaging lens in which a sign on an object side is negative with respect to an image plane as a reference, and fl is a focal length of the optical element.

2. The imaging optical system according to claim 1, wherein the following inequality is satisfied:

$$0.05 < Psum < 0.40$$

where Psum is a Petzval sum of the imaging lens.

3. The imaging optical system according to claim 1, wherein the following inequality is satisfied:

$$-0.050 < \sum \Phi i/\nu di < -0.001$$

where Φi and νdi are refractive power and Abbe number of an i-th lens, respectively, where i is a natural number, counted from an object side among lenses included in the imaging lens.

4. The imaging optical system according to claim 1, wherein the following inequality is satisfied:

$$0.8 < fmoe/fl < 3.0$$

wherein fmoe is a focal length of the diffractive surface.

5. The imaging optical system according to claim 1, wherein the following inequality is satisfied:

$$-1,0 < STO/fl < 2.5$$

wherein STO is a distance on an optical axis from the image plane to an aperture stop included in the imaging lens.

6. The imaging optical system according to claim 1, wherein the imaging lens consists of, in order from an object side to the image side, a first lens having negative refractive power, a second lens having positive refractive power, a third lens having positive refractive power, a fourth lens having negative refractive power, a fifth lens having positive refractive power, and a sixth lens having negative refractive power.

7. The imaging optical system according to claim 6, further comprising an aperture stop disposed between the first lens and the second lens.

8. An imaging optical system comprising:

an imaging lens; and an optical element disposed on an image side of the imaging lens, wherein at least one surface of the optical element is a metasurface with a controlled wavelength dispersion characteristic, wherein where $\nu_0$ is an Abbe number of the metasurface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_0} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/fl < 0.2$$

$$-0.10 < 1/\nu_0 < 0.02$$

where Tk is an exit pupil position of the imaging lens in which a sign on an object side is negative with respect to an image plane as a reference, and fl is a focal length of the optical element.

9. An image pickup apparatus comprising:

an imaging optical system; and an image sensor configured to image an object through the imaging optical system, wherein the imaging optical system includes:

an imaging lens; and an optical element disposed on an image side of the imaging lens, wherein at least one surface of the optical element is a diffractive surface with a controlled wavelength dispersion characteristic, and wherein where $\nu_0$ is an Abbe number of the diffractive surface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_0} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/fl < 0.2$$

$$-0.10 < 1/\nu_0 < 0.02$$

where Tk is an exit pupil position of the imaging lens in which a sign on an object side is negative with respect to an image plane as a reference, and fl is a focal length of the optical element.

10. An image pickup apparatus comprising:

an imaging optical system; and an image sensor configured to image an object through the imaging optical system, wherein the imaging optical system includes:

an imaging lens; and an optical element disposed on an image side of the imaging lens, wherein at least one surface of the optical element is a metasurface with a controlled wavelength dispersion characteristic, wherein where $\nu_0$ is an Abbe number of the metasurface, a reference wavelength is d-line, primary dispersion is F-line and C-line, $\psi(\lambda_d)$, $\psi(\lambda_F)$, and $\psi(\lambda_C)$ are optical path difference functions for the d-line, the F-line, and the C-line, respectively, $P(\lambda_d)$, $P(\lambda_F)$, and $P(\lambda_C)$ are optical path difference dispersions of a surface for the d-line, the F-line, and the C-line, respectively, the following equation is satisfied:

$$\frac{1}{\nu_0} \equiv \frac{\psi(\lambda_F) - \psi(\lambda_C)}{\psi(\lambda_d)} = \frac{\lambda_F P(\lambda_F) - \lambda_C P(\lambda_C)}{\lambda_d P(\lambda_d)},$$

and the following inequalities are satisfied:

$$-1.5 < Tk/fl < 0.2$$

$$-0.10 < 1/\nu_0 < 0.02$$

where Tk is an exit pupil position of the imaging lens in which a sign on an object side is negative with respect to an image plane as a reference, and fl is a focal length of the optical element.

* * * * *